United States Patent
Luo et al.

(10) Patent No.: US 9,842,433 B2
(45) Date of Patent: Dec. 12, 2017

(54) METHOD, APPARATUS, AND SMART WEARABLE DEVICE FOR FUSING AUGMENTED REALITY AND VIRTUAL REALITY

(71) Applicant: SuperD Co. Ltd., Shenzhen (CN)

(72) Inventors: Yanqing Luo, Shenzhen (CN); Peiyun Jian, Shenzhen (CN); Lei Song, Shenzhen (CN)

(73) Assignee: SUPERD CO. LTD., Shenzhen (CN)

( * ) Notice: Subject to any disclaimer, the term of this patent is extended or adjusted under 35 U.S.C. 154(b) by 0 days.

(21) Appl. No.: 15/237,424

(22) Filed: Aug. 15, 2016

(65) Prior Publication Data

US 2017/0301137 A1    Oct. 19, 2017

(30) Foreign Application Priority Data

Apr. 15, 2016  (CN) .......................... 2016 1 0239142

(51) Int. Cl.

| G06T 11/60 | (2006.01) |
|---|---|
| G06T 19/00 | (2011.01) |
| G06F 3/01 | (2006.01) |
| G02B 27/01 | (2006.01) |

(52) U.S. Cl.
CPC ............ *G06T 19/006* (2013.01); *G06F 3/013* (2013.01); *G02B 27/017* (2013.01); *G02B 2027/014* (2013.01); *G02B 2027/0132* (2013.01); *G02B 2027/0138* (2013.01); *G06T 2200/04* (2013.01)

(58) Field of Classification Search
CPC ................................................... G06T 19/006
See application file for complete search history.

(56) References Cited

U.S. PATENT DOCUMENTS

| 2013/0182077 | A1* | 7/2013 | Holz | H04N 5/232 |
|---|---|---|---|---|
| | | | | 348/46 |
| 2015/0208060 | A1 | 7/2015 | Kim et al. | |
| 2016/0163063 | A1* | 6/2016 | Ashman | G06F 3/011 |
| | | | | 345/633 |
| 2016/0240008 | A1* | 8/2016 | Haddick | G06T 11/001 |
| 2016/0261300 | A1* | 9/2016 | Fei | G06T 7/593 |
| 2016/0309134 | A1* | 10/2016 | Venkataraman | G02B 27/017 |
| 2016/0363770 | A1* | 12/2016 | Kim | G02B 27/0172 |
| 2017/0061700 | A1* | 3/2017 | Urbach | G06F 3/011 |
| 2017/0108697 | A1* | 4/2017 | El-Ghoroury | G09G 5/10 |
| 2017/0109916 | A1* | 4/2017 | Kurz | G06T 11/60 |

FOREIGN PATENT DOCUMENTS

| CN | 101067716 A | 11/2007 |
|---|---|---|
| CN | 102914932 A | 2/2013 |
| CN | 105075254 A | 11/2015 |

* cited by examiner

*Primary Examiner* — Phi Hoang
(74) *Attorney, Agent, or Firm* — Anova Law Group, PLLC

(57) ABSTRACT

A method, apparatus and smart wearable device for fusing augmented reality and virtual reality are provided. The method for fusing augmented reality (AR) and virtual reality (VR), comprising acquiring real-world scene information collected by dual cameras mimicking human eyes in real time from an AR operation; based on virtual reality scene information from a VR operation and the acquired real-world scene information, generating a fused scene; and displaying the fused scene.

20 Claims, 4 Drawing Sheets

METHOD, APPARATUS, AND SMART WEARABLE DEVICE FOR FUSING AUGMENTED REALITY AND VIRTUAL REALITY

CROSS-REFERENCES TO RELATED APPLICATIONS

This application claims priority of Chinese Application No. CN201610239142.2, filed on Apr. 15, 2016, the entire contents of which are hereby incorporated by reference.

FIELD OF THE INVENTION

The present disclosure generally relates to the field of augmented reality technologies and, more particularly, relates to method, apparatus and smart wearable device for fusing augmented reality and virtual reality.

BACKGROUND

Virtual Reality (VR), also known as immersive multimedia or computer-simulated reality, is a computer technology that replicates an environment, real or imagined, and simulates a user's physical presence and environment to allow for user interaction. That is, a VR operation comprehensively unitizes computer graphics systems, display devices, and interface equipment (e.g., controllers) to provide immersive user experience in a computer-generated three-dimensional (3D) interactive environment.

Augmented Reality (AR) is a technology that seamlessly integrates real-world information and virtual-world information. Various entity information (e.g., visual information, sound, taste, touch, etc.), which is difficult to experience within a certain time period and space in the real world, is simulated by computer technologies and overlaid on the real world. Thus, virtual information is implemented into the real world, and further perceived by human senses, enhancing or even exceeding one's current perception of reality. The real environment and virtual objects are superimposed onto a same screen in real time or coexist in a space. By contrast, VR replaces the real world with a simulated one.

That is, an AR operation not only demonstrates the real-world information, but also simultaneously provides virtual information, in which the two types of information are superimposed and supplementary to each other. In visual AR, users may adopt headsets through which the real world and computer graphics is overlapped with each other, and the computer graphics surrounded by the real world is observed.

Currently, headset displays similar to Oculus headsets allow users to experience the VR effect, while products similar to Google glasses allow users to experience the AR effect. Although an existing VR headset enables the user to watch virtual scenes and virtual characters, these virtual scenes and characters are all pre-designed or rendered based on specific algorithms, without being integrated with a real environment in which the user wears the VR headset. Thus, the existing VR headset may be short of an interaction with the real environment.

The existing AR eyeglasses enable the user to see the real-world environment in front, analyze the images of the real world, and provide corresponding information. However, the existing AR eyeglasses may not be able to provide the user with pleasure of realistic virtual scenes, i.e., AR technology may have difficulties to provide a smooth integration of virtuality and reality.

The disclosed method, apparatus and smart wearable device for fusing AR and VR are directed to solve one or more problems set forth above and other problems in the art.

BRIEF SUMMARY OF THE DISCLOSURE

One aspect of the present disclosure provides a method for fusing augmented reality (AR) and virtual reality (VR). The method comprises acquiring real-world scene information collected by dual cameras mimicking human eyes in real time from an AR operation; based on virtual reality scene information from a VR operation and the acquired real-world scene information, generating a fused scene; and displaying the fused scene.

Another aspect of the present disclosure provides an apparatus for fusing augmented reality (AR) and virtual reality (VR). The apparatus comprises a real-world scene information acquiring module, configured to acquire real-world scene information collected by dual cameras mimicking human eyes in real time from an AR operation; a fused scene generating module, configured to generate a fused scene based on virtual reality scene information from a VR operation and the acquired real-world scene information; and a fused scene displaying module, configured to display the fused scene.

Another aspect of the present disclosure provides a smart wearable device. The smart wearable device comprises dual cameras, configured to mimic human eyes to collect real-world scene information in real time; a processor, configured to be connected to the dual cameras, acquire the real-world scene information collected by the dual cameras, and generate a fused scene according to the acquired real-world scene information and virtual reality scene information; and a display, configured to be connected to the processor and display the fused scene.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to exemplary embodiments of the invention, which are illustrated in the accompanying drawings. Hereinafter, embodiments consistent with the disclosure will be described with reference to drawings. It is apparent that the described embodiments are some but not all of the embodiments of the present invention. Based on the disclosed embodiments, persons of ordinary skill in the art may derive other embodiments consistent with the present disclosure, all of which are within the scope of the present invention. Further, when no conflict exists, the exemplary features illustrated in various embodiments may be combined and/or rearranged.

The present disclosure provides a method, apparatus and smart wearable device for fusing AR function and VR function, which may be able to incorporate areal-world scene into a VR process, fuse the virtuality and reality, enhance human-computer interaction, and improve user experience. To facilitate the understanding of the disclosed embodiments, certain terms used in the disclosed embodiments may be explained first.

In the disclosed embodiments, information of real-world scene (or real-world scene information) may include information of a surrounding real-world environment, which may be recorded in real-time by dual-cameras mimicking human eyes. For example, the dual cameras may include a left camera and a right camera. According to directions of the line-of-sight of the user's left eye and right eye, the left camera and the right camera may respectively record an image sequence in real time, and each image sequence may include a plurality of images.

At a certain moment t, an image may be acquired from the image sequence recorded by the left camera and used as a left image, while an image may be acquired from the image sequence recorded by the right camera and used as a right image. In particular, the left image and the right image may simulate the content observed by the user's left eye and the content observed by the user's right eye, respectively.

Further, in the disclosed embodiments, an AR scene may refer to a scene generated from the real-world scene by the AR technology to be displayed to a viewer, and an VR scene may refer to a virtual scene generated by the VR technology to be displayed to the viewer. Information of VR scene (i.e., VR scene information) may include image information of VR models, for example, a left view image and a right view image of each VR model in the VR scene.

Figure 1:
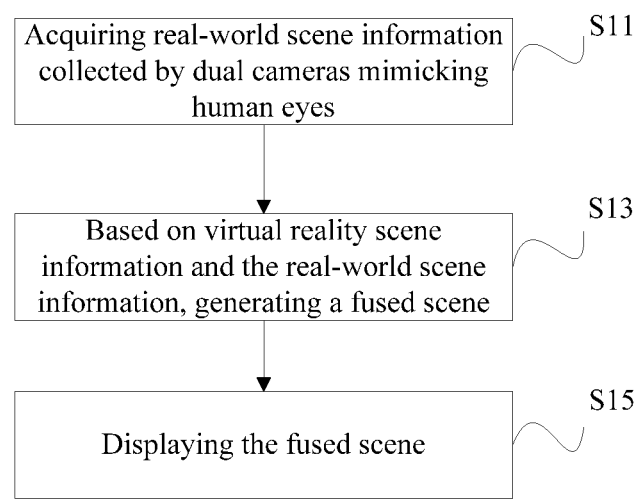
FIG. 1 illustrates a flow chart of an exemplary method for fusing VR and AR consistent with disclosed embodiments.

FIG. 1 illustrates a flow chart of an exemplary method for fusing VR function and AR function consistent with disclosed embodiments. As showing in FIG. 1, at the beginning, real-world scene information collected by the dual cameras mimicking human eyes is acquired (S11). For example, the real-world scene information collected by the dual cameras mimicking human eyes may be acquired from an AR operation.

The dual cameras may be provided in a smart wearable device, for example, a VR headset, to mimic human eyes to collect the real-world scene information. In particular, the dual cameras may include a left camera and a right camera, which may mimic a user's left eye and right eye, respectively. The real-world scene information may include at least one left image captured by the left camera and at least one right image captured by the right camera of the real-world scene.

Acquiring the real-world scene information collected by the dual cameras mimicking human eyes may further include: tracking direction changes of the human eyes' line-of-sight (e.g., movement and/or rotation of the human eyes), and adjusting the direction of the dual cameras according to the direction changes of the human eyes' line-of-sight. Thus, the adjusted direction of the dual cameras may follow the changed direction of the human eyes' line-of-sight, and the real-world scene information corresponding to the changed direction of the human eyes' line-of-sight may be collected in real time by the adjusted dual cameras. The human eyes' line-of-sight is also called as the line-of-sight in the following.

To enable the dual cameras to mimic human eyes to capture the real-world scene information, the dual cameras may have to collect the real-world scene information according to the direction of the line-of-sight. To obtain the changes in the line-of-sight, a line-of-sight tracking module capable of tracking changes in the line-of-sight may be installed inside a VR headset. To mimic the human eyes in a better way by the dual cameras to observe the scenes as the human eyes, a processor in the smart wearable device such as a VR headset, may respectively adjust the parameters of the left camera and the right camera, according to the parameters of the line-of-sight. For example, the direction, observation angles, field of views of the left camera and the right camera may have to be adjusted following the changes of the line-of-sight.

The images of the real-world scene respectively captured by the left camera and the right camera in real time may be provided to the left eye and the right eye, respectively, such that a visual perception of the human eyes may be reproduced. Various eye tracking technologies may be adopted, for example, eye tracking technologies based on eyes and eye periphery characteristics changes, iris angle changes, and actively projecting infrared to the iris and extracting characteristics to determine the line-of-sight changes.

The above-mentioned eye tracking technologies are only for illustrative purposes and are not intended to limit the scope of the present disclosure. Those skilled in the art may utilize any feasible eye tracking technology to track changes of the line-of-sight, and further adjust the directions of the left camera and right camera mimicking the human eyes to collect the real-world scene information in real time.

After the real-world scene information collected by the dual cameras mimicking human eyes is acquired, a fused scene is generated according to VR scene information and the real-world scene information (S13). The VR scene information may be stored in memory of the device and acquired in a VR operation. Generating the fused scene according to the VR scene information and the real-world scene information may further include the following steps: superimposing the left image captured by the left camera of the real-world scene and a left view image of a VR scene to obtain a left image of the fused scene; superimposing the right image captured by the right camera of the real-world scene and a right view image of the VR scene to obtain a right image of the fused scene; and generating the fused scene based on the left image of the fused scene and the right image of the fused scene. Because the fused scene is generated based on fusing the real-world scene information collected in real time by the dual cameras mimicking the human eyes and the VR scene information, the fused scene may be a fused AR-VR scene.

In particular, superimposing the VR scene information and the real-world scene information, for example, superimposing the VR scene to the real-world scene, may require the left camera and the right camera to provide the real-time image sequences of the real-world scene, respectively. Then at a certain moment t, an image may be acquired from the image sequence provided by the left camera, and used as the left image of the real-world scene; while an image may be acquired from the image sequence provided by the right camera, and used as the right image of the real-world scene. The left image and the right image may simulate the content observed by the user's left eye and the content observed by the user's right eye, respectively.

In certain embodiments, more than one images may be respectively acquired from the image sequence provided by the left camera and the image sequence provided by the right camera. For example, two images may be respectively acquired from the image sequence provided by the left camera and the image sequence provided by the right camera, which may be provided with an imaging processing and further used as the left image and the right image of the real-world scene, respectively.

Further, the real-time image sequences provided by the left camera and the right camera may be acquired through various approaches. For example, using software development kit (SDK) provided by the camera manufacturer to acquire the images, or utilizing some common open source tools to read the images from the cameras, such as Opencv.

To obtain hierarchy relationships of the real-world scene, a parallax between the left image and the right image of the real-world scene may be calculated, and the hierarchy of the parallax may present the hierarchy of the real-world scene. The parallax between the left image and the right image of the real-world scene may be calculated by any parallax calculation method, such as Boyer-Moore (BM), graph cuts, and ADCensus. Once the parallax is calculated, the hierarchy information of the real-world scene may be obtained. The hierarchy information of the real-world scene, which may also be called as the depth of focus information thereof, may guide the fusion between the VR models (i.e., the VR scene) and the real-world scene, such that the VR model may be more reasonably integrated into the real-world scene.

In particular, the minimum parallax of the VR model between the left image and the right image of the real-world scene may have to be larger than the maximum parallax between a covering area of the VR model in the left image and a covering area of the VR model in the right image of the real-world scene, and the parallax may have to be median smoothed before being used. The VR model may be respectively added to the left image and the right image of the real-world scene, i.e., the left view image of the VR model (i.e., the virtual scene) may be superimposed with the left image of the real-world scene, and the right view image of the VR model (i.e., the virtual scene) may be superimposed with the right image of the real-world scene. Thus, the fused scene (i.e., the fused AR-VR scene) may be generated.

That is, because the parallax of the VR model between the left image and the right image of the real-world scene is larger than the maximum parallax between the covering area of the VR model in the left image and the covering area of the VR model in the right image of the real-world scene, when the left view image and the right view image of the VR model (i.e., the virtual scene) are superimposed with the left image and the right image of the real-world scene, respectively, the VR model fused in the covering area may appear closer to the user's eyes than the real-world scene, i.e., the VR model may have the maximum parallax.

The minimum parallax of the VR model between the left image and the right image of the real-world scene may be referred as d, where d may be larger than the maximum parallax between the covering area of the VR model in the left image and the covering area of the VR model in the right image of the real-world scene.

After the fused scene is generated, the fused scene is displayed (S15). In the disclosed embodiments, the left image superimposed with the left view image of the VR model and the right image superimposed with the right view image of the VR model may be synthesized and sent to a display. In particular, the left image of the real-world scene superimposed with the left view image of the VR model may be displayed in a left portion of the display, while the right image of the real-world scene superimposed with the right view image of the VR model may be displayed in a right portion of the display. Thus, the fused scene may be displayed, and the user may observe the left portion and the right portion of the display through his/her left eye and the right eye, respectively, experiencing a desired fusion between the real-world scene and the VR model.

In the disclosed embodiments, in addition to the fused scene generated by fusing the real-world scene information and the VR scene information, an AR scene may also be generated based on the real-world scene information collected in real time by the dual cameras mimicking the human eyes, and a VR scene may also be generated based on the VR scene information, according to different application scenarios. Those skilled in the art can obtain the AR scene or the VR scene (corresponding to AR function or VR function) according to the disclosed embodiments, which is not repeated here. The fused scene is also called the fused AR-VR scene (corresponding to fused AR-VR function) in the following.

Further, when the smart wearable device has the AR function, VR function and fused AR-VR function, a switching among the AR function, VR function and fused AR-VR function may be realized through a scene switching instruction. In particular, the scene switching instruction may include a button switching instruction, a gesture switching instruction, and a distance sensing switching instruction, etc. The AR function, VR function and fused AR-VR function may correspond to a VR mode, AR mode and the VR-AR compatible mode, respectively. The VR mode, AR mode and the VR-AR compatible mode may be switched according to various application scenarios.

For example, a user plans to visit the Metropolitan Museum of Art at NYC. When arriving at the front yard of the museum, he wants to learn some basic information of the museum first, so he switches the smart wearable device to the AR mode. The dual cameras installed on the smart wearable device may take pictures of museum in real time, a processor and other hardware in the smart wearable device may recognize the target, search corresponding information (e.g., history, architectural description, layout, amenities, public access and security) in a local or cloud database, and display the information to the user.

Then the user walks into the museum and enjoys the self-guided tour. However, the user is not allowed to closely touch these finest arts. Then he may switch the smart wearable device to the fused AR-VR mode. Based on the real-world scene information collected in real time by the dual cameras mimicking the human eyes (i.e., images inside the museum captured by the dual cameras in real time) and the VR scene information (e.g., images of the arts) stored in memory of the device, a fused scene of the real museum and a virtual (computer-simulated) art may be generated and displayed to the user. Then the user may be able to see a physical presence of the art (actually it is computer-simulated) inside the museum, further take a close look at every detail of the art or even touch it.

After getting back home, the user wants to show the tour to his son who has not visited the museum yet. His son may wear the smart wearable device storing the images of the museum captured by the dual cameras and switch to the VR mode. The processor, hardware and software in the device may work together to replicate the museum based on the images taken by the dual cameras, simulate the son's physical presence in the museum, and allow for user interaction.

A most straightforward method for mode switching may be realized through an external button of the smart wearable device. For example, the external button may be provided in a certain portion of the headset, and the user may press the button to switch the modes. The mode switching may involve one button or multiple buttons. When the mode switching involves one button, for example, pressing the button once may switch the current VR mode to the AR mode, pressing the button once again may switch the current AR mode to the VR-AR compatible mode, and pressing the button once again may switch the current VR-AR compatible mode to the VR mode.

In addition, the mode switching may also be realized by gesture recognition methods. After the corresponding function modules are implemented into the smart wearable device, audio languages and body languages may also be adopted to switch the modes.

The mode switching may also be triggered under certain conditions, for example, the mode may be switched through sensing a distance. For example, the user is walking and wearing a headset in the VR mode, the headset may recognize an obstacle located within a certain distance in front, i.e., the headset may detect the distance between the user and the obstacle is smaller than a pre-set threshold, which may be equivalently to receive the distance sensing switching instruction. Thus, the mode may be switched accordingly, for example, the current VR mode may be switched to the VR-AR compatible mode or the AR mode.

In the disclosed embodiments, the real-world scene information collected by the dual cameras mimicking the human eyes may be acquired first, then according to the VR scene information and the real-world scene information, the fused scene may be generated and displayed. Thus, the real-world scene may be integrated into a VR process, a fused effect of virtuality and reality may be realized, human-computer interaction may be enhanced, and user experience may be improved. Moreover, due to a smooth integration of the real-world scene and the VR content, the user may be able to experience a more realistic integration of virtuality and reality. AR's incapability of integrating virtuality and reality, as well as, the incompatibility between VR devices and AR function, may be solved.

Further, the AR and VR functions may be realized through mode switching instructions, respectively. When the VR mode is switched on in the device, the device may be operated as a normal VR device. The virtual scene and virtual model may be watched on the device, and the user-machine interaction may be realized through head movements. When the AR mode is switched on in the device, the device may turn on the dual cameras to capture and display images to the user in real time. Meanwhile, the device may detect targets in the images provided by the dual cameras to obtain target information, such as category, and description, etc., and further display the target information.

Figure 2:
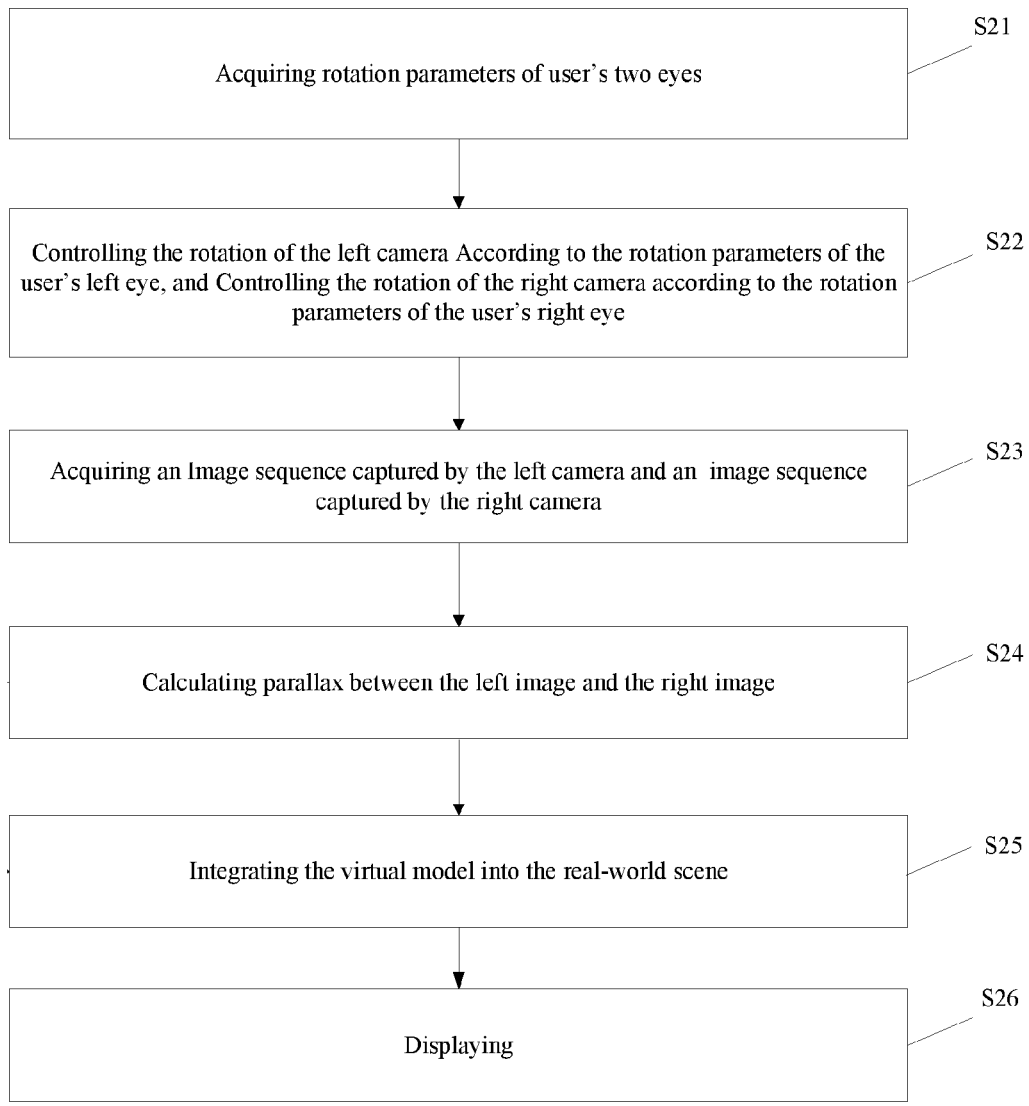
FIG. 2 illustrates a flow chart of another exemplary method for fusing VR and AR consistent with disclosed embodiments.

The disclosed method embodiments may be further explained by a following application example of aiding decoration drafting. FIG. 2 illustrates a flow chart of another exemplary method for fusing VR function and AR function consistent with disclosed embodiments. As shown in FIG. 2, the process of aiding decoration drafting may be explained as follows.

At the beginning, motion or rotation parameters of user's two eyes are acquired (S21). Acquiring the motion parameters of user's two eyes may play an important role in the process. In particular, the speed of acquiring the motion parameters of user's two eyes may directly affect the user experience. For example, a low acquiring speed may cause a substantial long delay between the movement of the eyes and the content observed by the dual cameras. In contrary, a high acquiring speed may reduce the delay between the movement of the eyes and the content observed by the dual cameras, such that the user may experience a more realistic scene after the virtual object and the real-world scene are fused. That is, the higher acquiring speed, the shorter delay between the movement of the eyes and the content observed by the dual cameras.

The motion parameters of user's two eyes may be acquired by commercial eye-tracking modules on the market, or acquired through Adaboost and Kalman algorithm. For example, the user's two eyes may be first detected by Adaboost, then tracked by Kalman algorithm to obtain rotation angles $\theta_x$ and $\theta_y$. $\theta_x$ may indicate the pupil movement parallel to the line connecting the corners of the eyes, and $\theta_y$ may indicate the pupil movement perpendicular to the line connecting the corners of the eyes.

After the rotation parameters of user's two eyes are acquired, the rotation of the left camera may be controlled according to the rotation parameters of the user's left eye, and the rotation of the right camera may be controlled according to the rotation parameters of the user's right eye (S22). For example, when the motion parameters of user's two eyes are acquired through Adaboost and Kalman algorithm, $\theta_x$ and $\theta_y$ of the user's left eye may control the rotation of the left camera, and $\theta_x$ and $\theta_y$ of the user's right eye may control the rotation of the right camera.

A camera rotation module may be similar to common rotatable cameras on the market, except that more compact and more flexible module may be highly desired and have to be customized. The camera rotation module may be configured to mainly receive the motion parameters $\theta_x$ and $\theta_y$, and based on the received $\theta_x$ and $\theta_y$, control the cameras to rotate and "look" at the direction where the human eyes are looking at. Thus, the image content captured by the cameras may be close to the content desired by the human eyes.

After the rotation of the left camera and the right camera are controlled, image sequences captured by the left camera and the right camera may be acquired, respectively (S23). In particular, to superimpose the virtual object and the real-world scene, the left camera and the right camera may provide the real-time image sequences of the real-world scene, respectively. At a certain moment t, an image may be acquired from the image sequence provided by the left camera and an image may be acquired from the image sequence provided by the right camera, which may be used as the left image and the right image, respectively. The left image of the real-world scene may simulate the content observed by the user's left eye, and the right image of the real-world scene may simulate the content observed by the user's right eye.

Further, the real-time image sequences of the real-world scene provided by the left camera and the right camera may be acquired through various approaches. For example, using software development kit (SDK) provided by the camera manufacturer to acquire the images, or utilizing some common open source tools to read the images from the cameras, such as Opencv.

After the left image and the right image of the real-world scene are obtained, a parallax between the left image and the right image of the real-world scene is calculated (S24). To obtain the hierarchy relationships of the real-world scene, a parallax may be calculated, and the hierarchy of the parallax may present the hierarchy of the real-world scene. The parallax between the left image and the right image may be calculated by any parallax calculation method, such as Boyer-Moore (BM), graph cuts, and ADCensus. Once the parallax is calculated, the hierarchy information of the scene of the real-world scene, which may also be called as the depth of focus information thereof, may be obtained. The depth of focus information of the real-world scene may guide the fusion between the VR model (i.e., the VR scene) and the real-world scene, such that the VR model may be more reasonably implemented into the real-world scene.

In particular, the minimum parallax of the VR model between the left image and the right image of the real-world scene may have to be larger than the maximum parallax between a covering area of the VR model in the left image and a covering area of the VR model in the right image of the real-world scene, and the parallax may have to be median smoothed before being used. The VR model may be respectively added to the left image and the right image, in which the minimum parallax of the VR model between the left image and the right image may be referred as d, where d may be larger than the maximum parallax between the covering area of the VR model in the left image and the covering area of the VR model in the right image of the real-world scene.

That is, because the parallax of the VR model between the left image and the right image of the real-world scene is larger than the maximum parallax between the covering area of the VR model in the left image and the covering area of the VR model in the right image of the real-world scene, when the left view image and the right view image of the VR model (i.e., the virtual scene) are superimposed with the left image and the right image of the real-world scene, respectively, the VR model fused in the covering area may appear closer to the user's eyes than the real-world scene, i.e., the VR model may have the maximum parallax.

Based on the parallax, the VR model may be integrated into the real-world scene (S25). In particular, the left view image of the VR model (i.e., the virtual scene) may be superimposed with the left image of the real-world scene, and the right view image of the VR model (i.e., the virtual scene) may be superimposed with the right image of the real-world scene. Thus, the fused scene may be generated.

After the fused scene is generated, the fused scene is displayed (S26). In particular, the left image superimposed with the left view image of the VR model and the right image superimposed with the right view image of the VR model may be synthesized and sent to a display. The left image superimposed with the left view image of the VR model and the right image superimposed with the right view image of the VR model may be displayed in a left portion and a right portion of the display, respectively. The user may observer the left portion and the right portion of the display through the left eye and the right eye, respectively, experiencing a desired fusion between the real-world scene and the VR model.

In the interior decorating, the use may wear the disclosed VR headset, in which the left camera and right camera installed on the VR headset may send images to the user's left eye and right eye, respectively. The user may be able to directly view an interior structure, without feeling the VR headset. Due to the lens in the VR headset, the user may be able to view a more spacious interior structure. When the user's head moves, the VR headset may also move. However, the relative position between the user's head and the VR headset may keep unchanged, thus, the user's observation of the interior structure through the cameras may not be affected. Further, the rotation of the user's eyes may drive the rotation of the cameras. The rotation of the cameras may be highly desired to be synchronized with the eyes. Higher performance processor and controlling modules may provide a better real-time feature.

After the user observe the interior structure of the house, the user may add the left view image and the right view image of the VR model to the left image and the right image of the real-world scene, respectively, i.e., a fused scene of the interior structure and the VR model may be generated. After the fused scene is displayed, the user may be able to see how the furniture (i.e., the VR model) is placed in the house or how the designed interior would look like in reality.

The VR headset-aided drafting may enable the user to see the house decoration more intuitively, and realize a favorite house decoration. The furniture may be virtually moved through the buttons on the VR headset, without pulling a muscle. Various commonly used indoor models may be provided, such as sofas, beds, dressers, tables, chairs, TV tables, and air conditioners, etc. The VR models may be produced by 3DMax, Maya, etc.

Figure 3:
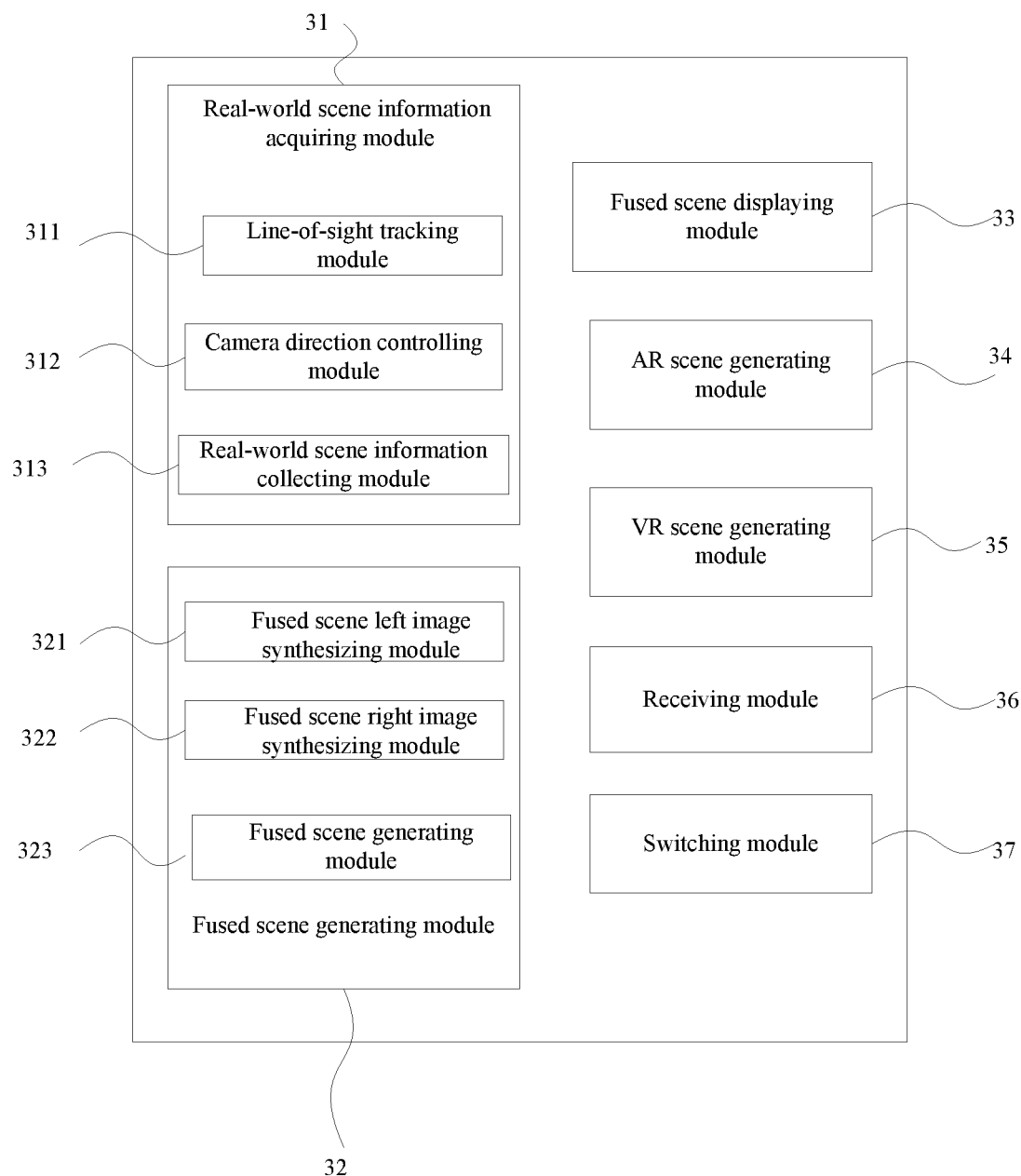
FIG. 3 illustrates a schematic diagram of an exemplary apparatus with fused VR and AR consistent with disclosed embodiments.

The present disclosure further provides a smart wearable device. FIG. 3 illustrates a schematic diagram of an exemplary apparatus with fused VR function and AR function consistent with disclosed embodiments. As shown in FIG. 3, the apparatus with fused VR and AR functions may include a real-world scene information acquiring module 31, a fused scene generating module 32, and a fused scene displaying module 33. The real-world scene information acquiring module 31 may be configured to acquire real-world scene information collected by dual cameras mimicking human eyes; the fused scene generating module 32 may be configured to generate a fused scene according to the VR scene information and the real-world scene information; and the fused scene displaying module 33 may be configured to display the fused scene.

To respectively realize the VR function and AR function, the apparatus may further include an AR scene generating module 34 and a VR scene generating module 35. The AR scene generating module 34 may be configured to generate AR scenes according to the real-world scene information collected by the dual cameras mimicking the human eyes, and the VR scene generating module 35 may be configured to generate VR scenes according to the VR scene information.

To switch among the VR function, AR function and fused AR-VR function, the apparatus may further include a receiving module 36 and a switching module 37. The receiving module 36 may be configured to receive scene switching instructions, and the switching module 37 may be configured to switch the apparatus to provide the fused AR-VR scene, or the AR scene, or the VR scene.

In particular, the real-world scene information acquiring module 31 may further include a line-of-sight tracking module 311, a camera direction controlling module 312, and a real-world scene information collecting module 313. The line-of-sight tracking module 311 may be configured to track changes in the line-of-sight. The camera direction controlling module 312, according to the line-of-sight changes, may be configured to adjust the directions of the dual cameras to align with or follow the direction of the line-of-sight. The real-world scene information collecting module 313 may be configured to acquire the real-world scene information collected by the adjusted dual cameras in real time.

The dual cameras may include a left camera and a right camera. The real-world scene information may include a left image captured by the left camera and a right image captured by the right camera. The VR scene information may include a left view image of the virtual scene and a right view image of the virtual scene.

The fused scene generating module 32 may further include a fused scene left image synthesizing module 321, a right image synthesizing module 322 and a fused scene generating module 323. The fused scene left image synthesizing module 321 may be configured to superimpose the left image captured by the left camera and the left view image of the virtual scene to obtain a left image of the fused scene. The fused scene right image synthesizing module 322 may be configured to superimpose the right image captured by the right camera and the right view image of the virtual scene to obtain a right image of the fused scene. The fused scene generating module 323 may be configured to generate the fused scene based on the left image of the fused scene and the right image of the fused scene.

The disclosed apparatus is based on a similar concept as the disclosed methods in FIG. 1 and FIG. 2, and the technical content provided in the disclosed methods is also be applicable to the disclosed apparatus, which are not repeated here.

In the disclosed embodiments, the real-world scene information collected by the dual cameras mimicking the human eyes may be acquired first, then according to the VR scene information and the real-world scene information, the fused scene may be generated and displayed. Thus, the real-world scene may be integrated into a virtual reality process, a fused effect of virtuality and reality may be realized. Moreover, human-computer interaction may be enhanced, and user experience may be improved.

Figure 4:
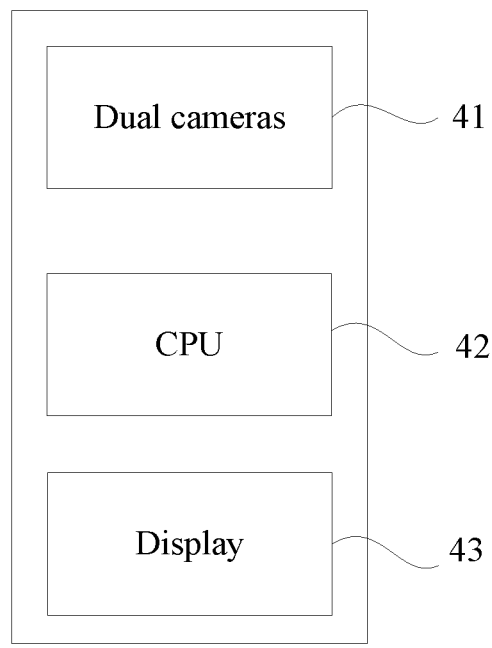
FIG. 4 illustrates a block diagram of an exemplary smart wearable device consistent with disclosed embodiments.

FIG. 4 illustrates a block diagram of an exemplary smart wearable device consistent with disclosed embodiments. The smart wearable device may be any appropriate wearable electronic device capable of realizing AR function, VR function and fused AR-VR function, such as a smart eyewear, a smart headset, and contact lenses, etc.

As shown in FIG. 4, the smart wearable device may include dual cameras 41, a processor 42, and a display 43. Other components may be added and certain components may be removed without departing from the principles of the disclosed embodiments. In one embodiment, as shown in FIG. 4, the processor 42 may be a central processing unit (CPU) 42.

In another embodiment, the processor 42 may include any appropriate type of central processing unit (CPU), graphic processing unit (GPU), general purpose microprocessor, digital signal processor (DSP) or microcontroller, and application specific integrated circuit (ASIC). The processor 42 may execute sequences of computer program instructions to perform various processes associated with the smart wearable device.

The dual cameras 41 may be configured to mimic human eyes and collect real-world scene information. The dual cameras 41 may be internal cameras in the device or may be external cameras connected to the device over a network. The dual cameras 41 may take images and/or videos to be processed by the CPU 42.

The CPU 42 may be configured to be connected to the dual cameras 41, acquire the real-world scene information collected by the dual cameras 41, and generate a fused scene according to the real-world scene information and VR scene information. The CPU 42 may be further configured to generate AR scenes according to the real-world scene information collected by the dual cameras 41, generate VR scenes according to the VR scene information, receive a scene switching instruction, and switch to the fused scene, AR scene or VR scene according to the scene switching instruction.

Further, the smart wearable device may also include a switching button, a sensor, and an eye tracking device (not drawn in FIG. 4). The switching buttons may receive button operations (e.g., pressing the button) and generate a button switching instruction. The sensor may sense gesture operations and generate a gesture switching instruction, or sense a distance and generate a distance sensing switching instruction. The eye tracking device may be connected to the CPU 42, tracking eye balls and line-of-sight changes.

The CUP 42 may also be configured to adjust the direction of the dual cameras (e.g., rotate the dual cameras) according to the line-of-sight changes tracked by the eye tracking device, such that the dual cameras may be able to collect the real-world scene information following the line-of-sight in real time. The various processes performed by the CUP 42 may be stored as a sequence of programs in memory, in which the programs may be called and executed by the CPU 42 when a certain process is required to be performed.

The display 43 may be configured to display the fused scene. The display 43 may be any appropriate type of display, such as plasma display panel (PDP) display, field emission display (FED), cathode ray tube (CRT) display, liquid crystal display (LCD), organic light emitting diode (OLED) display, light emitting diode (LED) display, or other types of displays.

The smart wearable device may also include other components (not drawn in FIG. 4), such as system memory, a system bus, an input/output unit, and a mass storage device. The system memory here is just a general term that may include read-only memory (ROM), random access memory (RAM) and etc. The ROM may store necessary software for a system, such as system software. The RAM may store real-time data, such as images for displaying.

The system bus may provide communication connections, such that the display device may be accessed remotely and/or communicate with other systems via various communication protocols, such as transmission control protocol/internet protocol (TCP/IP), hypertext transfer protocol (HTTP), etc.

The input/output unit may be provided for users to input information into the display device or for the users to receive information from the display device. For example, the input/output unit may include any appropriate input device, such as a remote control, a keyboard, a mouse, an electronic tablet, voice communication devices, or any other optical or wireless input devices.

Further, the mass storage device may include any appropriate type of mass storage medium, such as a CD-ROM, a hard disk, an optical storage, a DVD drive, or other type of storage devices.

Figure 5:
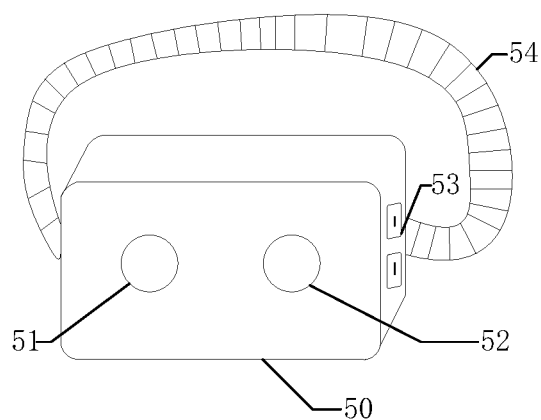
FIG. 5 illustrates an exemplary smart eyewear consistent with disclosed embodiments.

FIG. 5 illustrates a block diagram of exemplary smart eyewear consistent with disclosed embodiments. It should be noted that, the smart eyewear shown in FIG. 5 are only illustrative purposes, and are not intended to limit the scope of the present disclosure. As shown in FIG. 5, the smart eyewear may include a spectacle lens body 50, a right eye camera 51, a left eye camera 52, a physical button 53, a strap 54, a CPU (not drawn in FIG. 5) and a display (not drawn in FIG. 5). Other components may be added and certain components may be removed without departing from the principles of the disclosed embodiments.

In particular, the right eye camera 51 and the left eye camera 52 may be disposed at a front surface of the spectacle lens body 50 (i.e., the surface facing environment), and configured to collect the real-world scene information by mimicking the human eyes. The CPU and the display may be disposed inside the spectacle lens body 50. The physical button 53 may be configured to switch on/off the smart eyewear. Moreover, the user may also send an instruction the smart eyewear through the physical button 53. For example, the user may press the physical button 53 to send out a scene switching instruction, such that the smart eyewear may be switched among the VR mode, fused AR-VR mode and AR mode. The strap 54 may be configured to fix the smart eyewear to the user's head.

In the disclosed embodiments, the CPU may be configured to be a controlling center of the user terminal, which may unitize various interfaces and lines connecting the various components of the entire electronic device, and execute various functions of the electronic device and/or process data through running various software programs and/or modules stored in a memory unit and calling the data stored in the memory unit. The CPU may include integrated circuits, or multiple integrated chips of the same function or different functions. That is, the CPU may be a combination of graphic processing unit (GPU), a digital signal processor, and a controlling chip in a communication unit.

In the disclosed method and apparatus for fusion of augmented reality and virtual reality, and smart wearable device thereof, the real-world scene information collected by the dual cameras mimicking the human eyes may be acquired first, then according to the VR scene information and the real-world scene information, the fused scene may be generated and displayed. Thus, the real-world scene may be integrated into a virtual reality process, a fused effect of virtuality and reality may be realized, human-computer interaction may be enhanced, and user experience may be improved. Moreover, the VR mode, AR mode and VR-AR compatible mode may be switched by the scene switching instruction, providing a compatibility between VR devices and AR function.

Those skilled in the art would further appreciate that the various illustrative units and algorithm steps disclosed in the embodiments may be implemented as electronic hardware, computer software, or combinations of both. To clearly illustrate this interchangeability of hardware and software, various illustrative units and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The steps of a method or algorithm disclosed in the embodiments may be embodied directly in hardware, in a software unit executed by a processor, or in a combination of the two. A software unit may reside in RAM, flash memory, ROM, EPROM (erasable programmable read-only memory), EEPROM (electrically erasable programmable read-only memory), registers, hard disk, a removable disk, a CD-ROM, or any other form of storage medium known in the art.

The description of the disclosed embodiments is provided to illustrate the present invention to those skilled in the art. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for fusing augmented reality (AR) and virtual reality (VR), comprising:
acquiring real-world scene information collected by dual cameras mimicking human eyes in real time from an AR operation;
based on virtual reality scene information from a VR operation and the acquired real-world scene information, generating a fused scene; and
displaying the fused scene,
wherein:
the real-world scene information includes at least one left image and at least one right image of the real-world scene captured by the dual cameras,
the virtual reality scene information includes at least one left view image and at least one right view image of at least one virtual scene,
a minimum parallax of the at least one virtual scene between the at least one left image and the at least one right image of the real-world scene is larger than a maximum parallax between a covering area of the at least one virtual scene in the at least one left image and a covering area of the at least one virtual scene in the at least one right image of the real-world scene.

2. The method for fusing augmented reality and virtual reality according to claim 1, further including:
based on the real-world scene information collected by the dual cameras mimicking the human eyes, generating an augmented reality scene;
based on the virtual reality scene information, generating a virtual reality scene;
receiving a scene switching instruction; and
based on the scene switching instruction, switching to the fused scene, the augmented reality scene, or the virtual reality scene.

3. The method for fusing augmented reality and virtual reality according to claim 2, wherein:
the scene switching instruction is a button switching instruction, a gesture switching instruction, or a distance sensing switching instruction.

4. The method for fusing augmented reality and virtual reality according to claim 1, wherein acquiring real-world scene information collected by dual cameras mimicking human eyes further includes:
tracking a direction change of the human eyes' line-of-sight;
based on the changes of the human eyes' line-of-sight, adjusting a direction of the dual cameras to follow the direction change of the human eyes' line-of-sight; and
acquiring the real-world scene information collected in real time by the dual cameras after being adjusted.

5. The method for fusing augmented reality and virtual reality according to claim 4, wherein:
the dual cameras include a left camera and a right camera;
the real-world scene information includes the at least one left image captured by the left camera of the real-world scene and the at least one right image captured by the right camera of the real-world scene.

6. The method for fusing augmented reality and virtual reality according to claim 5, wherein based on virtual reality scene information and the real-world scene information, generating a fused scene further includes:
superimposing the at least one left image captured by the left camera of the real-world scene and the at least one left view image of the at least one virtual scene to obtain a left image of the fused scene;

superimposing the at least one right image captured by the right camera of the real-world scene and the at least one right view image of the at least one virtual scene to obtain a right image of the fused scene; and based on the left image of the fused scene and the right image of the fused scene, generating the fused scene.

7. An apparatus for fusing augmented reality (AR) and virtual reality (VR), comprising:
a real-world scene information acquiring module, for acquiring real-world scene information collected by dual cameras mimicking human eyes in real time from an AR operation;
a fused scene generating module, for generating a fused scene based on virtual reality scene information from a VR operation and the acquired real-world scene information; and
a fused scene displaying module, for displaying the fused scene,
the real-world scene information includes at least one left image and at least one right image of the real-world scene captured by the dual cameras,
the virtual reality scene information includes at least one left view image and at least one right view image of at least one virtual scene,
a minimum parallax of the at least one virtual scene between the at least one left image and the at least one right image of the real-world scene is larger than a maximum parallax between a covering area of the at least one virtual scene in the at least one left image and a covering area of the at least one virtual scene in the at least one right image of the real-world scene.

8. The apparatus for fusing augmented reality and virtual reality according to claim 7, further including:
an augmented reality scene generating module, for generating an augmented reality scene based on the real-world scene information collected by the dual cameras mimicking the human eyes,
a virtual reality scene generating module, for generating a virtual reality scene based on the virtual reality scene information;
a receiving module, for receiving a scene switching instruction; and
a switching module, for switching to the fused scene, the augmented reality scene, or the virtual reality scene based on the scene switching instruction.

9. The apparatus for fusing augmented reality and virtual reality according to claim 8, wherein:
the scene switching instruction is a button switching instruction, a gesture switching instruction, or a distance sensing switching instruction.

10. The apparatus for fusing augmented reality and virtual reality according to claim 7, wherein real-world scene information acquiring module further includes:
a line-of-sight tracking module, for tracking a direction change in the human eyes' line-of-sight;
a camera direction controlling module, for adjusting a direction of the dual cameras based on the direction change of the human eyes' line-of-sight; and
a real-world scene information collecting module, for acquiring the real-world scene information collected in real time by the dual cameras after being adjusted.

11. The apparatus for fusing augmented reality and virtual reality according to claim 10, wherein:
the dual cameras include a left camera and a right camera;
the real-world scene information includes the at least one left image captured by the left camera of the real-world scene and the at least one right image captured by the right camera of the real-world scene.

12. The apparatus for fusing augmented reality and virtual reality according to claim 11, wherein the fused scene generating module further includes:
a fused scene left image synthesizing module, for obtaining a left image of the fused scene through superimposing the at least one left image captured by the left camera of the real-world scene and the at least one left view image of the at least one virtual scene;
a fused scene right image synthesizing module, for obtaining a right image of the fused scene through superimposing the at least one right image captured by the right camera of the real-world scene and the at least one right view image of the at least one virtual scene; and
a fused scene generating module, for generating the fused scene based on the left image of the fused scene and the right image of the fused scene.

13. A smart wearable device, comprising:
dual cameras, configured to mimic human eyes to collect real-world scene information in real time;
a processor, configured to be connected to the dual cameras, acquire the real-world scene information collected by the dual cameras, and generate a fused scene according to the acquired real-world scene information and virtual reality scene information; and
a display, configured to be connected to the processor and display the fused scene,
wherein:
the real-world scene information includes at least one left image and at least one right image of the real-world scene captured by the dual cameras,
the virtual reality scene information includes at least one left view image and at least one right view image of at least one virtual scene,
a minimum parallax of the at least one virtual scene between the at least one left image and the at least one right image of the real-world scene is larger than a maximum parallax between a covering area of the at least one virtual scene in the at least one left image and a covering area of the at least one virtual scene in the at least one right image of the real-world scene.

14. The smart wearable device according to claim 13, wherein the processor is further configured to:
generate an augmented reality scene based on the real-world scene information collected by the dual cameras mimicking the human eyes,
generate a virtual reality scene based on the virtual reality scene information;
receive a scene switching instruction; and
switch to the fused scene, the augmented reality scene, or the virtual reality scene based on the scene switching instruction.

15. The smart wearable device according to claim 14, further including:
a switching button configured to receive a button operation and generate a button switching instruction.

16. The smart wearable device according to claim 14, further including:
a sensor configured to sense a gesture operation and generate a gesture switching instruction, or sense a distance and generate a distance sensing switching instruction.

17. The smart wearable device according to claim 13, further including:

an eye tracking device connected to the processor, configured to track eye balls and a direction change in the human eyes' line-of-sight.

18. The smart wearable device according to claim 17, wherein the processor is further configured to:
adjust a direction of the dual cameras based on the direction change of the human eyes' line-of-sight, such that the dual cameras collect the real-world scene information in real time according to the direction in the human eyes' line-of-sight.

19. The smart wearable device according to claim 18, wherein:
the smart wearable device is a smart eyewear or a headset.

20. The smart wearable device according to claim 13, wherein:
the processor is central processing unit.

* * * * *